Dec. 2, 1924.

J. B. PRIESTHOFF

GLARE DIMMER

Filed Feb. 16, 1923

1,517,455

INVENTOR
JOHN B. PRIESTHOFF

BY Carey S. Frye
ATTORNEY

Patented Dec. 2, 1924.

1,517,455

UNITED STATES PATENT OFFICE.

JOHN B. PRIESTHOFF, OF KOKOMO, INDIANA, ASSIGNOR OF ONE-HALF TO GEORGE WILKEN, OF LATONIA, KENTUCKY.

GLARE DIMMER.

Application filed February 16, 1923. Serial No. 619,486.

*To all whom it may concern:*

Be it known that I, JOHN B. PRIESTHOFF, a citizen of the United States, residing at Kokomo, in the county of Howard and State of Indiana, have invented new and useful Improvements in Glare Dimmers, of which the following is a specification.

This invention relates to glare dimmers and is designed primarily for use in connection with the wind shield of an automobile for dimming the rays of light from an approaching machine, the prime feature of the invention being the provision of a foldable shield portion which may be extended when in use or folded when not in use.

A further feature of the invention is the provision of means for operating the shield portion of the device for opening or closing the same.

A further feature of the invention is the provision of means for attaching the device to the wind shield and in such manner that the dimmer will not obstruct the vision of the operator when not in use.

Other objects and advantages will be hereinafter more fully set forth and pointed out in the accompanying specification.

In the accompanying drawings which are made a part of this application;

Figure 1:
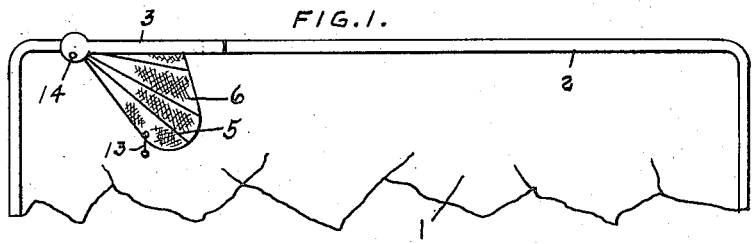
Figure 1 is a front elevation of a wind shield with the dimmer applied to use.
Figure 2:
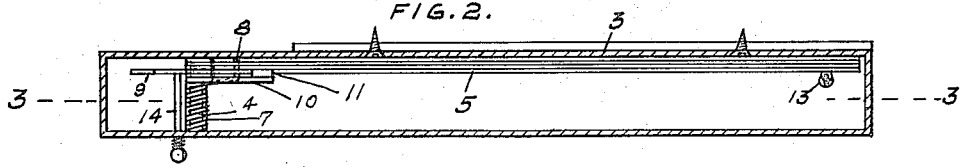
Fig. 2 is a top plan view of the dimmer.
Figure 3:
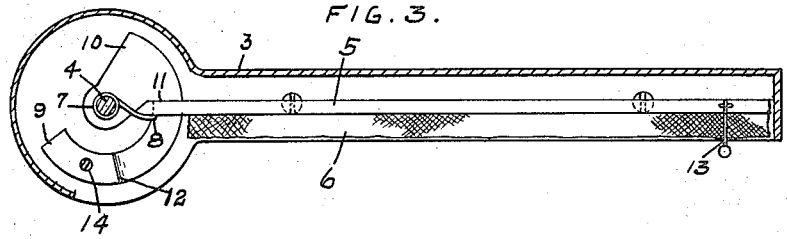
Fig. 3 is a sectional view thereof as seen on line 3—3 Figure 2.

Referring to the drawings, 1 indicates a wind shield for an automobile which may be of any preferred construction, to the frame 2 of which is attached the housing 3 of the glare dimmer, the housing being secured to the frame in any appropriate manner.

Extending transversely through the housing 3 is a shaft 4, upon which is pivoted one end of a plurality of arms or ribs 5, and attached to said ribs is a shield portion 6 of any suitable material, such as will dim or entirely exclude the rays of light from an approaching vehicle, and preferably consists of a section of fabric, although sections of celluloid or similar material may be used.

The ribs 5 are returned to their inoperative positions and the shield portion stored within the housing 3 by means of a coiled spring 7, said spring being coiled around the shaft 4 and having one of its ends secured to the housing while the opposite end 8 thereof is hooked beneath the ribs 5, whereby the tension of the spring will raise all of said arms or ribs when the lowermost rib is released.

The ribs 5 are held in their extended or operative positions by means of a spring tongue 9, said tongue terminating in a plate portion 10 which is fixed to the shaft 4 and has a shoulder 11 for limiting the upward movement of the ribs 5, while the tongue 9 is provided with an offset 12 for holding the ribs in their operative or extended positions.

Any suitable means may be provided for manually moving the ribs and shield portion to operative position, such as a knob 13, while a push pin 14 is attached to the free end of the tongue 9 and extended through the housing 3 so that by applying inward pressure on the pin, the offset portion of the tongue will be removed from the path of the lowermost rib 5, when the spring 7 will return all the ribs and the shield portion to position within the housing.

Some of the ribs 5 are preferably made longer than the others so that the shield portion will be more or less oblong, thereby insuring that the shield will fully protect the vision of the operator against the glare while at the same time the operator may have a clearer vision directly forward of the vehicle.

In operating this form of device, the knob 13 is grasped and a downward pull directed thereon until the lowermost rib 5 interlocks with the offset 12, the shield being then held in operative position any desired length of time. When the shield is to be returned to its inoperative position, inward pressure is directed against the push pin 14, which will remove the offset 12 from the path of the rib 5, whereupon the spring 7 will return the ribs and shield portion to inoperative position within the housing 3.

Figure 4:
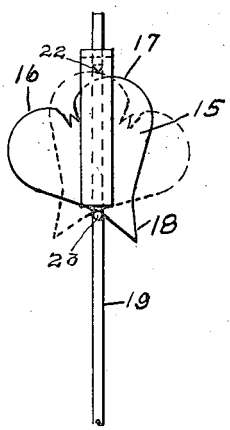
Figure 4 is an elevation of a slightly modified means for operating the dimmer.
Figure 5:
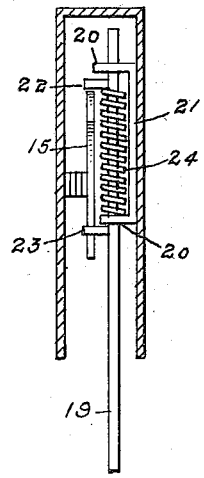
Fig. 5 is an edge elevation thereof.

When that form of operating device shown in Figs. 4 and 5 is used, the spring 7 is dispensed with and a cam 15 substituted for the tongue 9 and plate portion 10, said cam being substantially heart-shaped, thus providing a pair of opposed cam faces 16 and 17 at its upper end and a tapered terminal 18 at its lower end. Cooperating with the cam 15 is a vertically movable plunger 19, mounted slidably through arms 20 of a bracket 21, which bracket is in turn secured to parts of the housing 3.

Extending laterally from the plunger 19 is a pair of studs 22 and 23, one of which is adapted to engage the cam faces 16 or 17 and the other the tapered terminal 18, for rotating the cam 15 and swinging the ribs 5 to operative or inoperative positions. The plunger 19 is normally held in elevated position by means of a spring 24, which is coiled around the plunger 19 and has its ends located respectively between the upper stud 22 and the lower arm 20, consequently, when the plunger is given a downward pull the spring 24 will be tensed.

In operating this form of device to move the shield portion to operative position, a downward pull is given on the plunger 19, which will cause the shank 22 to engage the cam face 17 and rotate the cam 15, this rotating action swinging the ribs 5 to partial operative position or a sufficient distance to swing the terminal 18 beyond the stud 23 so that when the pull on the plunger 19 is released, the spring 24 will elevate the plunger and continue the rotation of the cam 15 until the ribs 5 have been moved to their full operative positions.

This leaves the cam 16 in position to be engaged by the stud 22 when an additional downward pull is directed on the plunger, consequently the cam 15 will be reversely rotated and the ribs and shield portion returned to inoperative position. As best shown in Fig. 4 of the drawings, the cam faces 16 and 17 are so constructed that the stud 22 will pass slightly beyond the center of gravity of the cam, thereby insuring that the terminal 18 will pass slightly beyond the stud 23 at each operation of the plunger.

This device may be very cheaply manufactured and readily applied to use and owing to the collapsible or folding feature of the shield portion, will occupy but a minimum amount of space when not in use. Furthermore the shield may be quickly moved to operative position or returned to inoperative position.

What I claim is:

1. In a glare dimmer, a shaft, a plurality of ribs pivoted on said shaft, foldable material connected to said ribs for forming a shield, a plate fixed to said shaft, a shoulder thereon for limiting the upward movement of said ribs, a curved spring tongue extending from said plate, an offset in said tongue adapted to engage the forwardmost rib for holding the shield in extended position, means for releasing the shoulder from the rib, and means for returning all the ribs to collapsed position.

2. In a glare dimmer, a housing, a shaft fixed in said housing, a plurality of ribs pivoted on said shaft, foldable material connected to said ribs for forming a shield when the ribs are extended, a plate fixed to said shaft, means on the plate for limiting the upward movement of said ribs, an arcuate spring tongue extending from said plate in juxtaposition to the line of travel of said ribs, an offset in said tongue adapted to engage one of the ribs for holding the shield in extended position, a push pin adapted to release the shoulder of the tongue from the rib and a spring for returning all of the ribs to collapsed position.

In testimony whereof I hereto affix my signature.

JOHN B. PRIESTHOFF.